(12) United States Patent
Iden

(10) Patent No.: US 6,282,802 B1
(45) Date of Patent: Sep. 4, 2001

(54) HAND-HELD NEEDLELESS COMPASS

(75) Inventor: Marlin D. Iden, Riverton, WY (US)

(73) Assignee: The Brunton Company, Riverton, WY (US)

( * ) Notice: Subject to any disclaimer, the term of this patent is extended or adjusted under 35 U.S.C. 154(b) by 0 days.

(21) Appl. No.: 09/134,449

(22) Filed: Aug. 14, 1998

Related U.S. Application Data

(63) Continuation-in-part of application No. 09/123,071, filed on Jul. 27, 1998.

(51) Int. Cl.$^7$ ............................. G01C 17/02; G01C 17/12
(52) U.S. Cl. ................................ 33/348; 33/347; 33/349; 33/355 R
(58) Field of Search ......................... 33/348, 349, 351, 33/352, 354, 355 R, 364, 344, 271, 272, 273, 333, 334, 347, 241–3; 24/3.11, 3.12, 136 C, 563, 616; D10/74

(56) References Cited

U.S. PATENT DOCUMENTS

| | | | |
|---|---|---|---|
| D. 421,232 | * 2/2000 | Hosey | D10/74 |
| 916,058 | * 3/1909 | Tessey | 33/241 |
| 2,287,863 | * 6/1942 | Buckley | 33/350 |
| 4,438,568 | * 3/1984 | Kramer et al. | 33/348 |
| 4,462,164 | * 7/1984 | Norman et al. | 33/355 R |
| 4,599,920 | * 7/1986 | Schmid | 81/489 |
| 4,785,495 | * 11/1988 | Dellis | 16/421 |
| 4,790,095 | * 12/1988 | Campos | 42/73 |
| 4,877,167 | * 10/1989 | McNemar | 224/269 |
| 5,313,376 | * 5/1994 | McIntosh | 362/119 |
| 5,313,712 | * 5/1994 | Curameng et al. | 33/354 |
| 5,440,792 | * 8/1995 | Ida | 24/615 |
| 5,740,952 | * 4/1998 | Huckenbeck | 224/271 |

\* cited by examiner

Primary Examiner—Diego Gutierrez
Assistant Examiner—R. Alexander Smith
(74) Attorney, Agent, or Firm—John E. Reilly

(57) ABSTRACT

A multi-function, hand-held compass is made up of a base member having a compass vial at one end and a socket at the opposite end to releasably attach to a clip. A lateral depression is formed in the base member to facilitate gripping of the compass, and a dual-prism sighting system is disposed at the opposite end of the base member to that of the vial. Graduated markings for a protractor are formed in surrounding relation to the compass vial along with pie-shaped recesses and magnifying lenses in the base both to take azimuth readings and map readings.

20 Claims, 6 Drawing Sheets

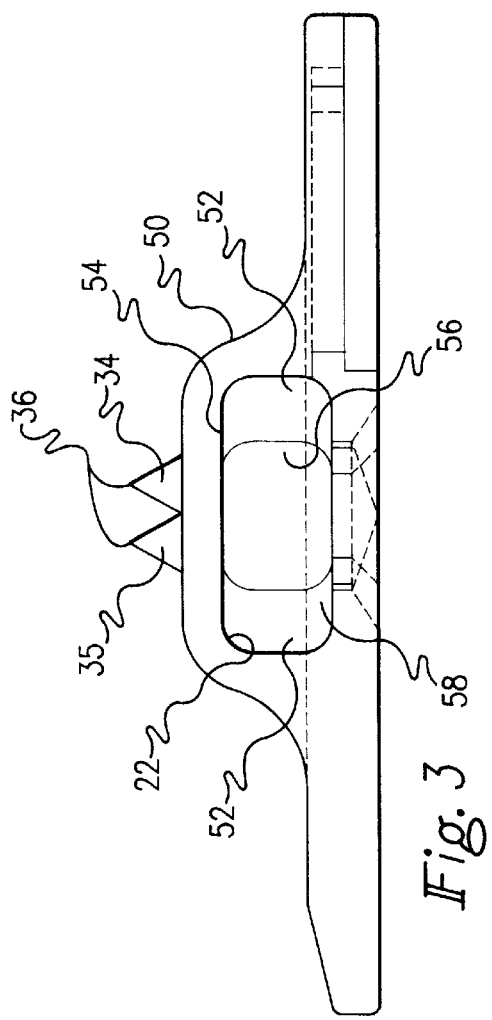
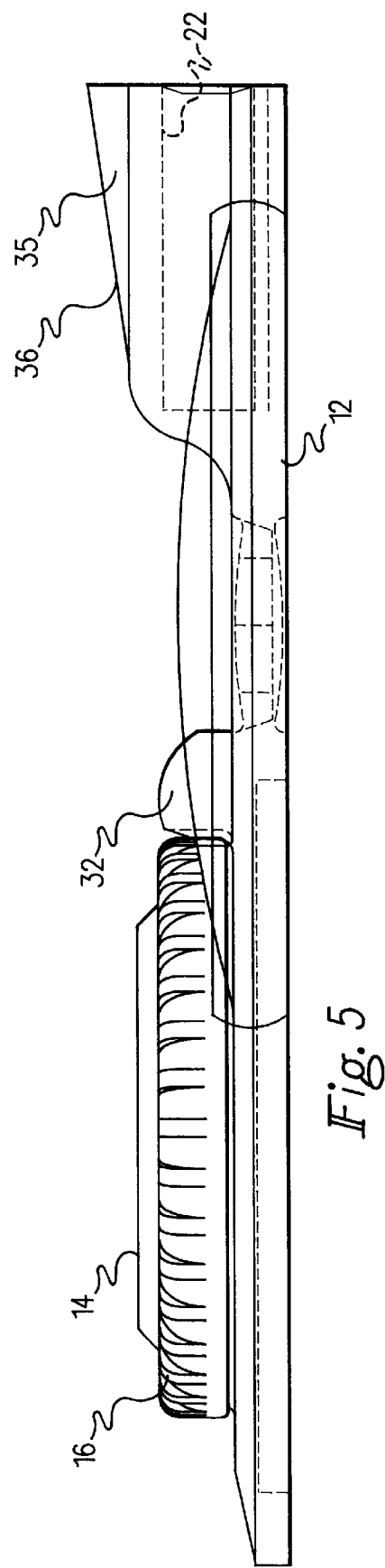

HAND-HELD NEEDLELESS COMPASS

Cross-Reference to Related Applications

This application is a continuation-in-part of patent application Ser. No. 09/123,071, filed Jul. 27, 1998 for LOW PROFILE COMPASS WITH REMOVABLE PROTECTIVE COVER AND MAGNETIC BULL'S EYE ALIGNMENT SYSTEM by Marlin D. Iden and assigned to the assignee of this invention.

BACKGROUND AND FIELD OF INVENTION

This invention relates to compasses, and more particularly relates to a novel and improved base member for a compass which is compact, versatile and of simplified, lightweight construction.

Various types of recreational compasses have been devised which are broadly characterized by having a transparent base member and compass vial or capsule with an azimuth ring which is mounted in the base member without the use of positive fastening elements so that the vial and azimuth ring can be jointly or individually rotated. For example, reference is made to U.S. Pat. No. 4,438,568 assigned to The Brunton Company of Riverton, Wyoming, the assignee of this invention. This invention, however, is concerned more with the design and construction of a recreational compass which can be hand-held and is adapted for mounting of a bull's eye or needleless vial in association with a protractor ring at one end of the mounting base and a sight at the opposite end to facilitate ease of reading or taking bearings with the compass. In this connection, it is desirable to provide in a compass base member for a novel and improved manner and means for releasably securing the compass to one's person and to enable its use for determining locations on a topographic map.

SUMMARY OF THE INVENTION

It is an object of the present invention to provide for a novel and improved compass which is extremely versatile, of lightweight construction and is contoured to fit comfortably within the hand for the purpose of taking readings or bearings.

It is another object of the present invention to provide for a novel and improved compass base member specifically adaptable for use in combination with a fluid-filled compass vial which is frictionally mounted in the base and contains a magnetic bull's eye alignment system rather than a needle.

It is a further object of the present invention to provide for a novel and improved mounting base for a compass which can be detachably secured to one's person.

It is a still further object of the present invention to provide for a novel and improved mounting base for a compass which is characterized by having a housing for a compass capsule at one end of the base and a novel and improved sight at the opposite end.

Broadly, the present invention resides in a base member in the form of an elongated body having a flat undersurface with a compass vial mounted in an opening adjacent one end of the body and a lateral depression on one side of and adjacent to an opposite end of the body to facilitate grasping and use of the compass. In the preferred form, the lateral depression is of generally concave configuration and is provided with a lining of soft pliable material. A sighting device at the opposite end of the body to that of the compass vial is preferably made of up a pair of ridges in closely spaced parallel relation to one another extending lengthwise on an upper surface of the body intermediately between opposite sides, the ridges being of generally triangular cross-sectional configuration and each terminating in a sight edge which inclines downwardly from the opposite end of the body toward the vial.

A socket is formed in one end of the body, preferably at the opposite end, to receive a clip for securing to the waist or to a lanyard for releasably securing to one's person. The elongated body defining the mounting base for the compass is preferably in the form of a thin transparent plate with a magnifying lens formed out of its thickness which can be used for reading maps as well as for a fire starter; also, quadrantal or pie-shaped apertures are formed out of the thickness of the plate to define a protractor reading system. The base plate may incorporate other scales and indicia customarily associated with compasses.

The above and other objects, advantages and features of the present invention will become more readily appreciated and understood from a consideration of the following detailed description of preferred and modified forms of the present invention when taken together with the accompanying drawings in which:

BRIEF DESCRIPTION OF THE DRAWINGS

FIG. 1A illustrates a modified type of clip for use in releasably securing the compass to the waistline or belt;

FIG. 3 is an end view of the preferred form of compass;

FIG. 5 is a side view in elevation of the compass shown in FIG. 1;

FIG. 6 is a top plan view of the clip with lanyard attachment shown in FIG. 1;

DETAILED DESCRIPTION OF PREFERRED EMBODIMENT

Figure 1:
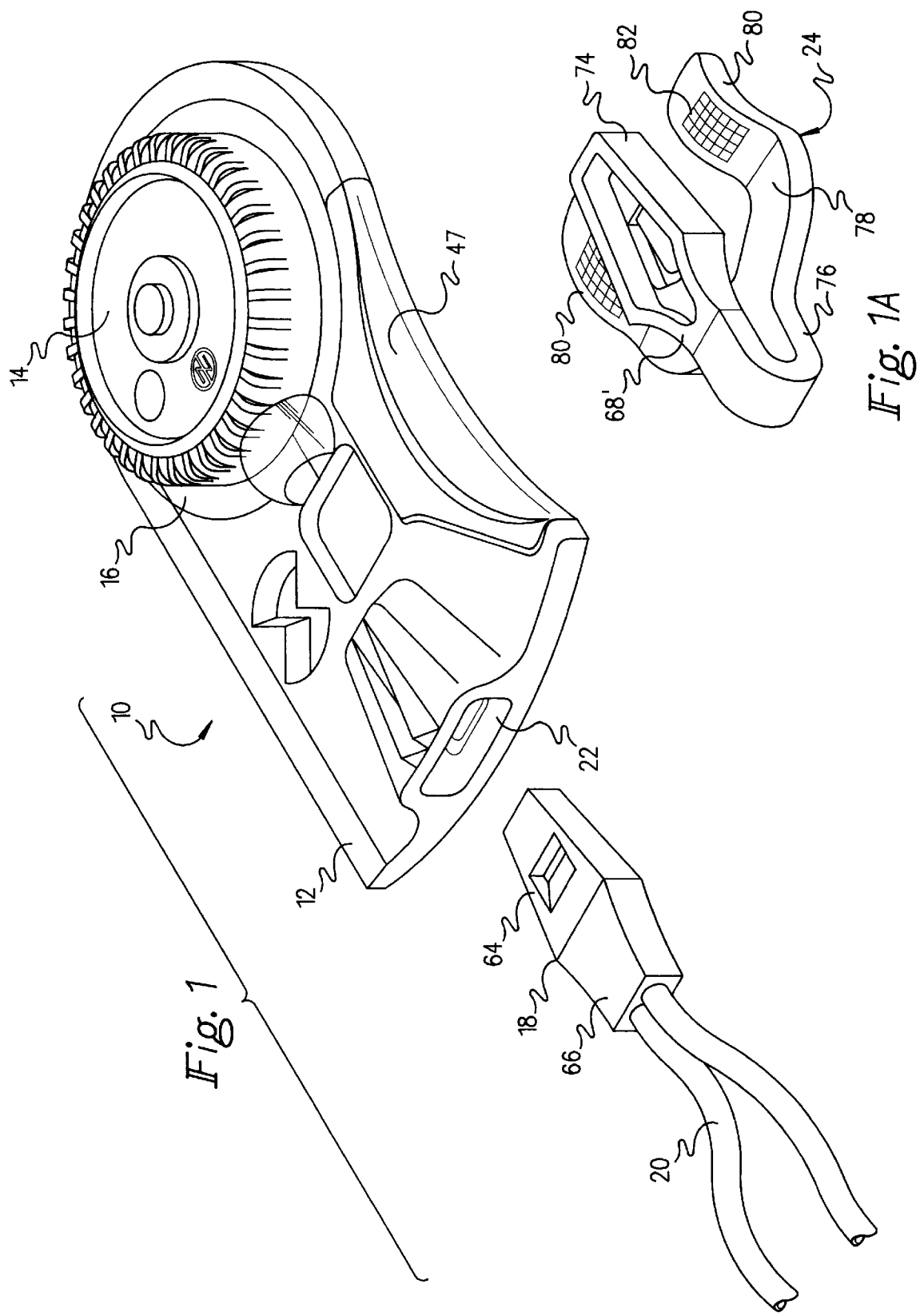
FIG. 1 is a somewhat fragmentary, perspective view of a preferred form of compass and illustrating one type of clip for attachment of the compass to a lanyard, in accordance with the present invention.

Referring in more detail to the drawings, there is illustrated in FIGS. 1 and 1A a preferred form of compass assembly which is broadly comprised of a compass 10 made up of a transparent, one piece elongated body or base member 12, a compass vial 14 with azimuth ring 16, and a clip 18 at the nd of a lanyard 10 which is adapted for releasable insertion into a socket 22 in the base member 12. FIG. 1A illustrates a modified form of clip 24 which can be used interchangeably with the clip 18 and releasably inserted into the socket 22. The alternate form of clip 24 serves more as a means of clipping onto one's waist, pocket or to another article, such as, a map. On the other hand, the clip 18 may serve the dual function of a high frequency whistle for safety, position location and animal alert.

Figure 2:
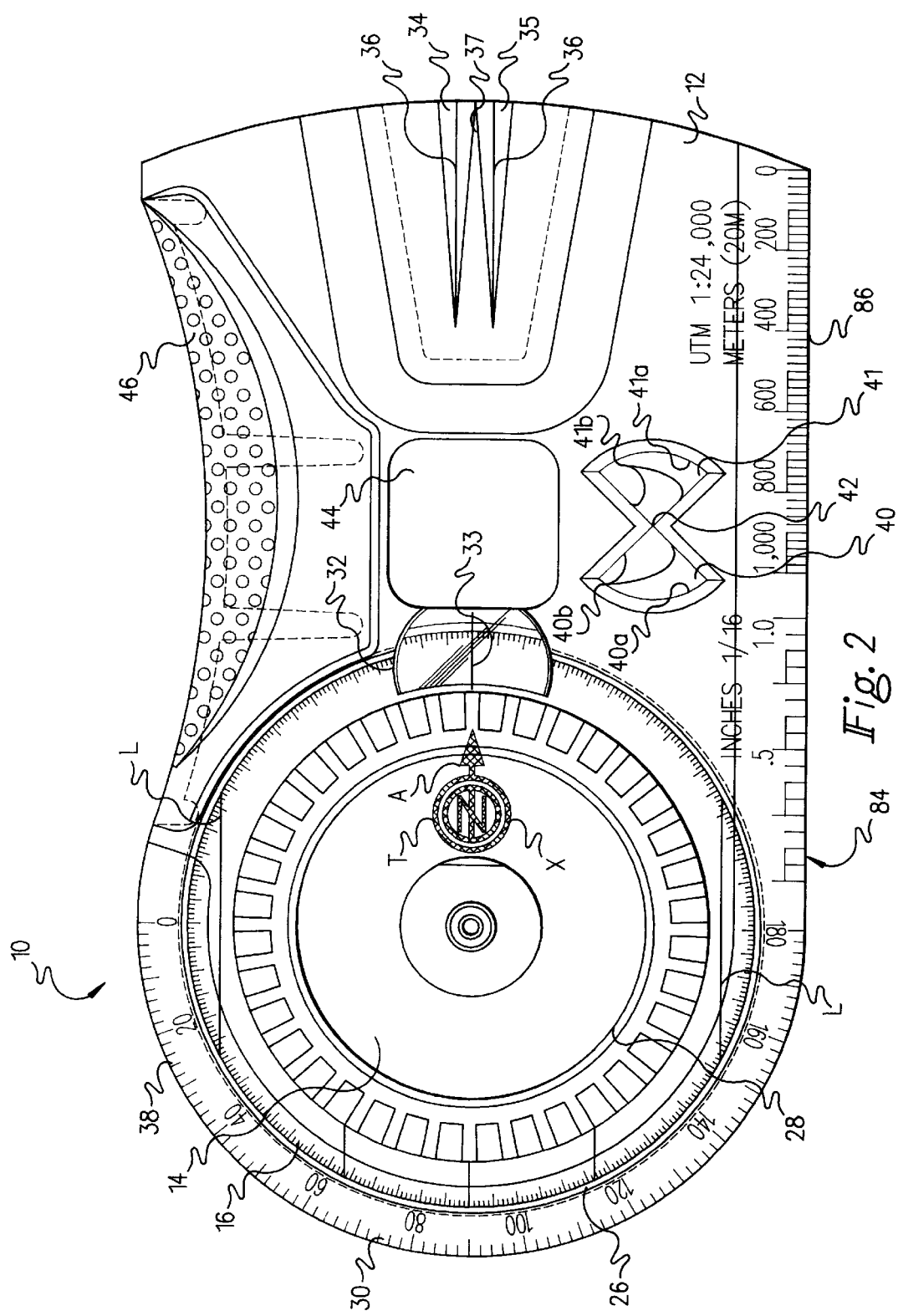
FIG. 2 is an enlarged top plan view of the compass illustrated in FIG. 1.
Figure 4:
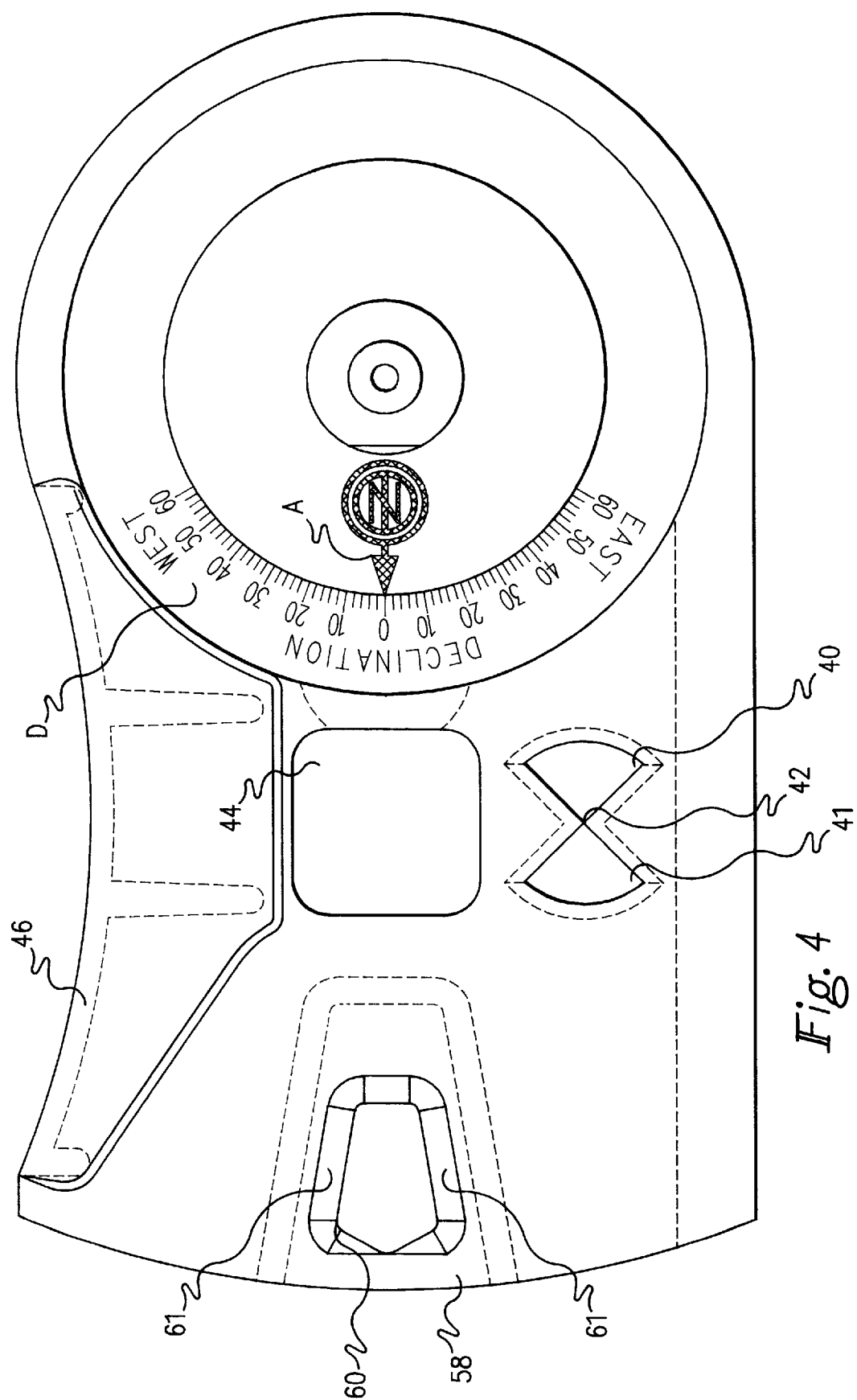
FIG. 4 is an enlarged bottom plan view of the preferred form of compass shown in FIGS. 1 to 3.

As illustrated in more detail in FIGS. 2 to 4, the compass body 12 is in the form of a transparent plate having an annular wall 26 at one end which is raised slightly above the surface of the body 12 to define a housing or opening for snug-fitting insertion of the compass vial 14. The specific mounting and disposition of the compass vial 14 and azimuth ring 16 are set forth and described in more detail in my hereinbefore referred to application for patent which is incorporated by reference herein. Broadly, however, the vial 14 is a transparent sealed enclosure of cylindrical configuration which is filled with a clear damping fluid to dampen movement of a clear plastic disk 28 within the vial. As a part of a bull's eye target alignment system, a circle T is imprinted on the disk together with the letter "N"; and a circle X with a radially extending arrow A is imprinted on a bottom wall of the vial. The azimuth ring 16 includes a circular dial 30 which is graduated in 1° increments and is readable through a magnifying prism 32 formed out of the thickness of the base and which is provided with an index line 33 on its undersurface to eliminate parallax in reading the dial. Although not so indicated in FIG. 2, the dial 30 has graduations numbered every 10°, and parallel lines L are arranged at spaced intervals across the azimuth ring 16, as shown in FIG. 2, for orientation alignment in a North/South direction on a topographic map.

As shown in FIG. 4, a "declination" scale designated at D is provided on the back or undersurface of the azimuth ring 16 so that the declination of magnetic North can be set according to the geographical area in which the compass is to be used. This is done by rotating the azimuth ring 16 to preset the arrow A with respect to the scale. Once set, a bearing can be taken with the aid of a dual prism alignment system defined by the elongated parallel sights 34 and 35 at the end of the base 12 opposite to the vial 14. The sights 34 and 35 extend in closely spaced, parallel relation to one another lengthwise on an upper surface portion of the base 12 intermediately between opposite sides, each sight correspondingly being of generally triangular cross-sectional configuration and tapering upwardly to terminate in a sight edge 36. Each side edge 36 also tapers or converges in a lengthwise direction toward the vial 14 so that the sight edges 36 are inclined downwardly, the sights functioning in a unique way to cause the reflected light to be centered or converge between the sight lines 36 along the common groove or channel 37 formed between the sights 34 and 35.

The one end of the body 12 in which the vial 14 is situated is of generally semi-circular configuration and provided with markings 38 at 2° increments to define a 180° protractor ring surrounding the vial 14. In addition, a pair of quadrants in the form of generally pie-shaped apertures 40 and 41 with circumferential borders 40*a* and 41*a* and tapered or convergent side edges 40*b* and 41*b*, converge toward one another and intersect at a common point 42 to define a protractor reading system, for example, when the compass is placed on a topographic map. In this way, the apertures 40, 41 serve as a centering template for the protractor portion of the compass vial. A typical operation would be as follows:

1. On the map, place a "point" at a starting position and an "X" at a destination.
2. Draw a bearing line connecting both marks.
3. Determine true north from the map's legend.
4. Draw a true north-south line through the "point".
5. Place the centering template directly over the "point".
6. Trace an outline around the "point" which is hidden under the intersection of the two apertures 40 and 41 and specifically along the borders 40A and 41A and side edges 40B and 41B.
7. With 0° on the protractor pointing "north", position center of needle disk within the outline.
8. Using the 0° to 180° scale around the circular edge 26, read bearing where the bearing line intersects the protractor. Directly adjacent to the protractor reading system is a magnifying prism 44 to aid in reading information off of the topographic map, and the prism 44 can also serve as a fire starter.

A lateral depression 46 is formed in one side of the base member 12, the depression being of generally concave configuration similar to a beveled edge extending over one-half the length of the base from the opposite end. Preferably, the depression 46 is covered with a soft pliable liner 47 which may be composed of a rubber or other resilient, non-metallic material to facilitate gripping or cradling of the compass in the hand either with the fingers or thumb of the hand running along the depression 46. The base member itself is gradually tapered along the length of the depression 46 in a direction extending away from the center line of the base as well as being of reduced width in defining the depression 46 and thus develop an enhanced sense of feel when grasping the compass and aligning in a particular direction.

As best seen from FIGS. 1 to 5, the socket 22 is of generally rectangular configuration and extends through the opposite end of the base 12 to that of the vial 14 with a raised portion 50 defining opposite sides 52 and top wall 54 which converge inwardly to terminate in an end wall 56. A bottom wall 58 is provided with a generally trapezoidal opening 60 formed out of the thickness of the base member and provided with beveled edges 61 in surrounding relation to the opening.

Figure 6:
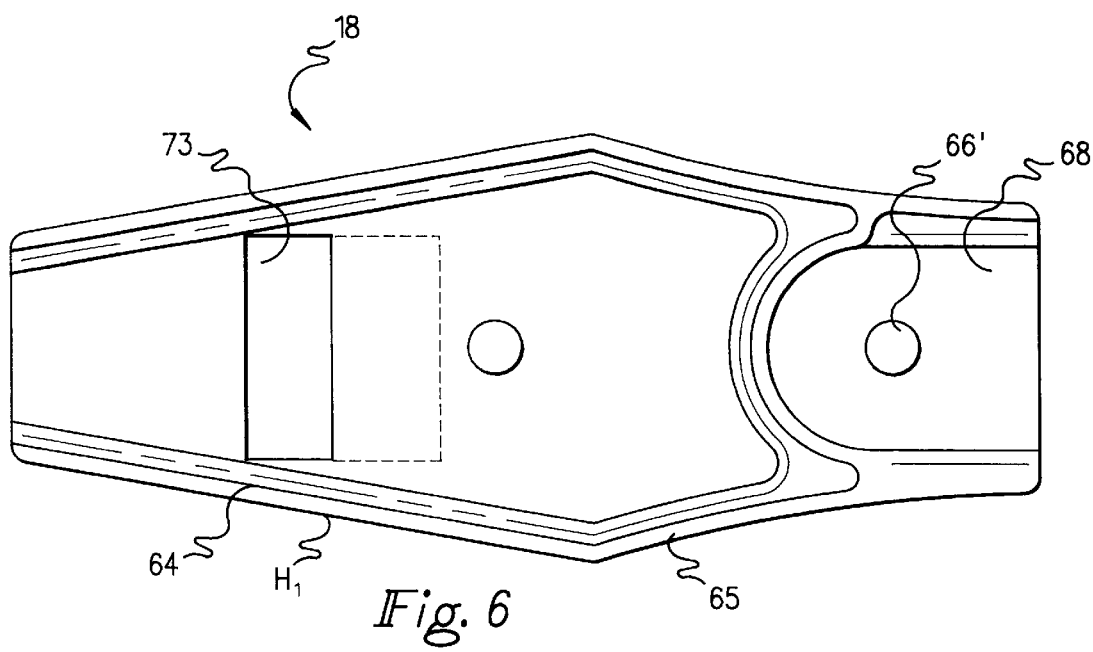
FIG. 6 is a top plan view of the lanyard attachment shown in FIG. 1.
Figure 6A:
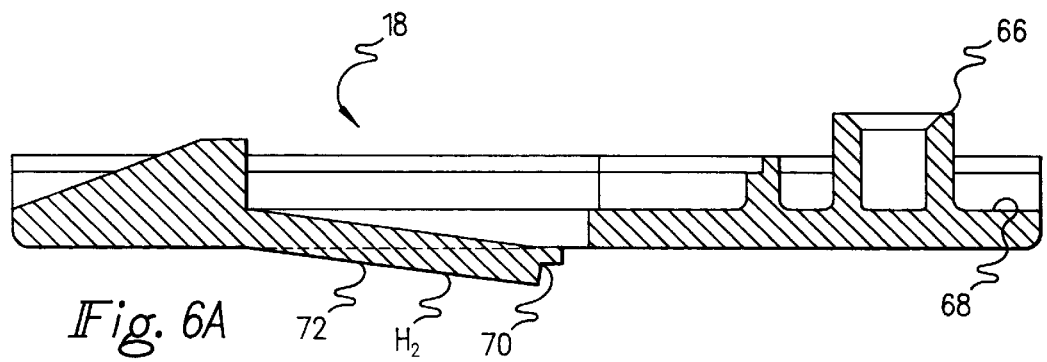
FIG. 6A is a sectional view of the lower half of the clip with lanyard attachment shown in FIG. 1.
Figure 7:
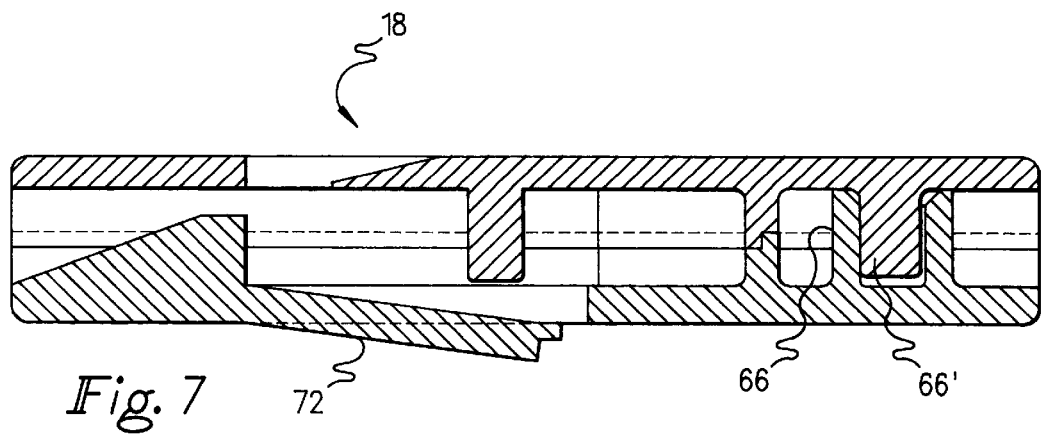
FIG. 7 is another sectional view of upper and lower assembled halves of the clip shown in FIGS. 6 and 6A.

FIGS. 6 and 7 illustrate the upper and lower halves $H_1$ and $H_2$, respectively, of the clip 18 in further detail. The upper and lower halves $H_1$ and $H_2$ are bonded together to define a leading end portion 64 which is of tapered configuration complementary to the configuration of the socket 22 and a trailing end 65 which converges rearwardly away from the leading end 64. The lower half is provided with a boss 66 within an inset portion 68, and the upper half has a pin 66' inserted and permanently fastened to the boss 66. The lanyard 20 is looped around the boss 66 prior to assembly of the halves $H_1$ and $H_2$ together so as to effect permanent connection of the lanyard 20 to the clip 18. A ledge 70 on an offset portion 72 projects downwardly from the underside of the lower half of the clip 18 so that when the clip is advanced into the socket 22 the ledge 70 will spring upwardly until it clears the opening 60 and then springs back in a downward direction to lodge against one edge of the opening and prevent accidental removal of the clip from the socket 22. In order to release the lanyard connector or clip 18 from the socket 22, the offset portion 72 is manually pressed upwardly to clear the edge of the opening 60 and the clip 18 is then retracted from the socket. The upper half $H_1$ is provided with a slotted portion 73 to define in cooperation with the inner cavity formed between the halves $H_1$ and $H_2$ in the leading end portion 64 a standard whistle which, as previously described, is provided for safety, position location and animal alert.

Figure 8:
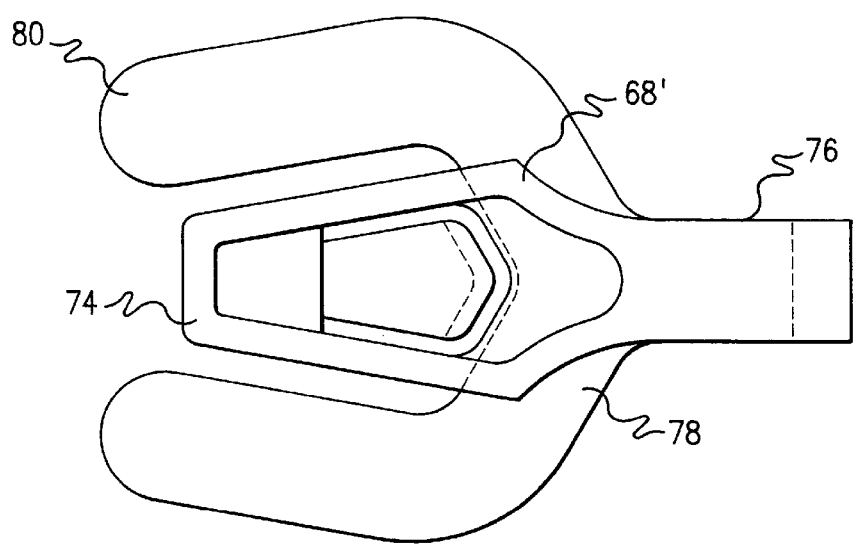
FIG. 8 is a top plan view of the clip illustrated in FIG. 1A.
Figure 9:
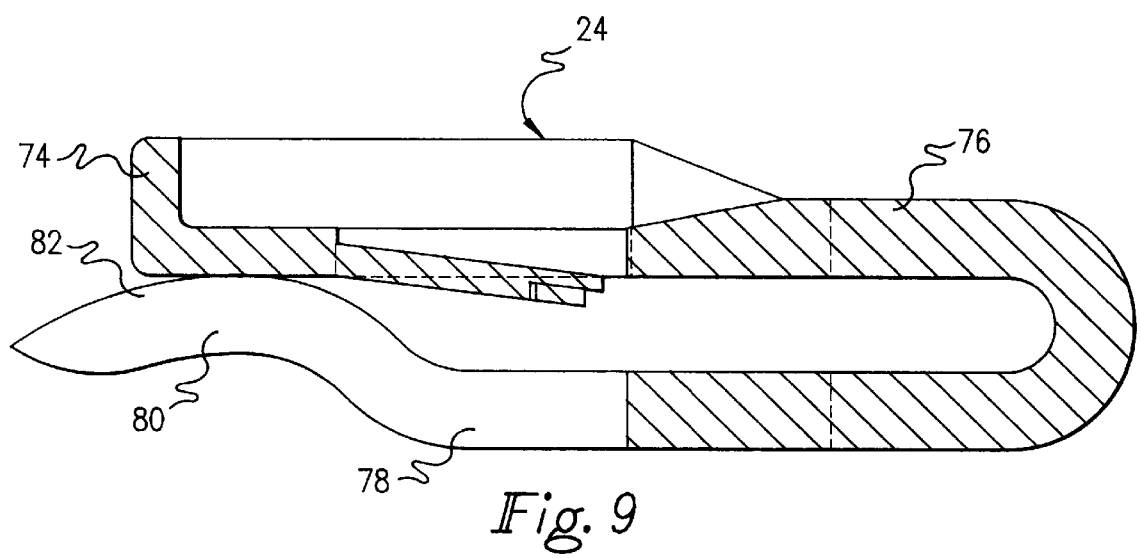
FIG. 9 is a cross-sectional view of the clip illustrated in FIG. 8.

The modified form of clip 24, as shown in FIGS. 1, 8 and 9 includes a clip body 74 which corresponds to the clip body 18 hereinbefore described, except that the trailing end 68' is solid and includes a continuation 76 which is doubled upon itself and terminates in a bifurcated end 78 having raised foot portions 80 with roughened surfaces 82. The clip body 74 is insertable into the socket 22 in the same manner as the clip 18 with the bifurcated end portion 78 bearing against the undersurface of the base 12. The clip 24 is composed of a plastic material having limited resiliency such that the foot portions or pads 80 may be separated slightly away from the undersurface of the base to enable placement on the waist or belt. The bifurcated end 78 enables access to the offset portion 70 of the clip to force out of engagement with the edge of the opening 60 for release or removal of the clip 24 from the base 12.

From the foregoing, the compass of the present invention is well-suited for use as an outdoor or recreational compass which can be worn on the person and readily accessible for use in taking a bearing as described as well as to take protractor readings. It is also adapted for use in determining locations and bearings on a topographic map and, to this end, is provided both with a linear measure in inches as designated at 84 or in meters as designated at 86 in FIG. 2. It will be apparent that the base member 12 is conformable for use with different types of compass files, but the bull's eye target alignment system as described is especially useful with the sights 34, 35 in taking a compass reading. The lateral depression 46 and its liner 47 enable the compass to be more comfortably and firmly grasped in lining up with a particular target or object and, in this regard, it will be evident that the lateral depression may be formed along both sides of the base member as desired.

It is therefore to be understood while preferred and modified forms of invention are herein set forth and described, various modifications and changes may be made to the construction and arrangement of parts without departing from the spirit and scope of the present invention as defined by the appended claims and reasonable equivalents thereof.

I claim:

1. In a hand-held compass having a base member containing a compass vial provided with a directional indicator therein, the improvement comprising:

said base member being in the form of a one-piece elongated plate having a top surface, a flat undersurface and terminating in a circular edge at one end thereof, said vial mounted in an opening adjacent to said one end of said plate, and a lateral depression defining a thumb rest in one side of and adjacent to an opposite end of said plate.

2. In a hand-held compass according to claim 1 wherein said depression is of generally concave configuration and defines a continuation of said circular edge.

3. In a hand-held compass according to claim 1 wherein said plate includes a socket in said opposite end extending substantially parallel to an imaginary plane passing through said plate.

4. In a hand-held compass according to claim 3 wherein a clip is releasably insertable into said socket.

5. In a hand-held compass according to claim 1 wherein said one end of said plate is of generally semi-circular configuration, and said opposite end of said plate is provided with a pair of sights extending in closely spaced parallel relation to one another lengthwise on an upper surface of said plate intermediately between said one side and an opposite side of said plate.

6. In a hand-held compass according to claim 5 wherein said sights are of generally triangular configuration and intersect one another along a common edge, each said sight tapering upwardly and terminating in a sight edge, each said sight edge being inclined downwardly toward said vial.

7. In a hand-held compass according to claim 1 wherein said plate is provided with a pair of pie-shaped apertures having tapered sides converging into a common edge between said apertures.

8. In a hand-held compass having a base member containing a compass vial provided with a directional indicator therein, the improvement comprising:

said base member being in the form of a one-piece, elongated plate having a top surface, a flat undersurface and terminating in a circular edge at one end thereof, said vial mounted in an opening adjacent to said one end of said plate, and a depression defining a thumb rest in one side of and adjacent to an opposite end of said plate; and wherein said depression is of generally concave configuration and a soft, pliable liner covering said depression along said one side of said plate.

9. In a hand-held compass according to claim 8, wherein said vial is in the form of a transparent casing filled with a damping fluid, a circular index member on one face of said casing and a movable pointer of generally circular configuration in said vial.

10. In a hand-held compass according to claim 9 wherein said plate includes a socket in said opposite end.

11. In a hand-held compass according to claim 10 wherein a clip is releasably insertable into said socket.

12. In a hand-held compass according to claim 9 wherein said one end of said plate is of generally semi-circular configuration, and said opposite end of said plate is provided with a pair of sights extending in closely spaced parallel relation to one another lengthwise on an upper surface of said plate intermediately between said one side and an opposite side of said plate.

13. In a hand-held compass according to claim 12 wherein said sights are of generally triangular configuration and intersect one another along a common edge, each said sight tapering upwardly and terminating in a sight edge, each said sight edge being inclined downwardly from said opposite end toward said vial.

14. In a hand-held compass according to claim 9 wherein said plate is provided with a pair of pie-shaped apertures having tapered sides converging into a common center between said apertures.

15. In a hand-held compass having a base member containing a compass vial provided with a directional indicator therein, the improvement comprising:

said base member being in the form of a one-piece elongated plate having a flat undersurface, said vial mounted in an opening adjacent to one end of said plate;

a socket in an end of said plate opposite to said one end; and a clip releasably insertable into said socket.

16. In a hand-held compass according to claim 15 wherein said clip includes a resilient projection engageable with an edge of an opening in said socket to releasably attach said clip to said socket.

17. In a hand-held compass according to claim 15 wherein said clip includes a lanyard connected thereto.

18. In a hand-held compass according to claim 15 wherein said clip includes a continuation adapted for supporting said compass on a waist or belt of the user.

19. In a hand-held compass according to claim 15 wherein said socket tapers in a direction toward said compass vial, and said clip has a tapered portion complementary to that of said socket.

20. In a hand-held compass according to claim 19 wherein said clip has a hollow interior.

* * * * *